United States Patent
Sung et al.

(10) Patent No.: US 11,369,941 B2
(45) Date of Patent: Jun. 28, 2022

(54) METHOD FOR PREPARING POROUS CARBON MATERIAL BY USING COAL TAR GENERATED IN COG PROCESS

(71) Applicant: POSCO CHEMICAL CO., LTD., Pohang-si (KR)

(72) Inventors: Dong-Min Sung, Pohang-si (KR); Ki-Don Nam, Pohang-si (KR)

(73) Assignee: POSCO CHEMICAL CO., LTD., Pohang-si (KR)

( * ) Notice: Subject to any disclaimer, the term of this patent is extended or adjusted under 35 U.S.C. 154(b) by 212 days.

(21) Appl. No.: 16/756,290

(22) PCT Filed: Oct. 2, 2018

(86) PCT No.: PCT/KR2018/011707
§ 371 (c)(1),
(2) Date: Apr. 15, 2020

(87) PCT Pub. No.: WO2019/083185
PCT Pub. Date: May 2, 2019

(65) Prior Publication Data
US 2020/0316559 A1    Oct. 8, 2020

(30) Foreign Application Priority Data

Oct. 26, 2017 (KR) .................. 10-2017-0139899

(51) Int. Cl.
| | | |
|---|---|---|
| C01B 31/02 | (2006.01) | |
| B01J 20/20 | (2006.01) | |
| C01B 32/336 | (2017.01) | |
| C01B 32/33 | (2017.01) | |
| B01J 20/30 | (2006.01) | |

(52) U.S. Cl.
CPC ........... *B01J 20/20* (2013.01); *B01J 20/3064* (2013.01); *B01J 20/3078* (2013.01); *C01B 32/33* (2017.08); *C01B 32/336* (2017.08)

(58) Field of Classification Search
CPC .................................................. C01B 32/336
See application file for complete search history.

(56) References Cited

U.S. PATENT DOCUMENTS

| | | |
|---|---|---|
| 6,485,864 B1 | 11/2002 | Miyazawa et al. |
| 2005/0069481 A1 | 3/2005 | Sonobe et al. |

FOREIGN PATENT DOCUMENTS

| | | |
|---|---|---|
| CN | 1393946 A | 1/2003 |
| CN | 1607174 A | 4/2005 |
| CN | 101294090 A | 10/2008 |
| CN | 101497027 A | 8/2009 |
| CN | 102225755 A | 10/2011 |
| CN | 103787331 A | 5/2014 |
| CN | 104709905 A | 6/2015 |
| CN | 105366675 A | 3/2016 |
| CN | 106486673 A | 3/2017 |
| CN | 106904612 A | 6/2017 |
| CN | 107055505 | 8/2017 |
| JP | 10284061 | 10/1998 |
| JP | 2000313609 A | 11/2000 |
| JP | 2004285130 A | 10/2004 |
| JP | 2015117175 | 6/2015 |
| KR | 100584251 | 5/2006 |
| KR | 20140092435 | 7/2014 |
| KR | 20150075218 A | 7/2015 |
| KR | 101651835 | 8/2016 |
| KR | 20170105151 | 9/2017 |

OTHER PUBLICATIONS

International Search Report—PCT/KR2018/011707 dated Jan. 7, 2019.
Indian Office Action—Indian Application No. 202017015796 dated Nov. 10, 2020, citing CN 107055505 and KR 10-2014-0092435.
J. Machnikowski et al. "Co-treatment of novolac- and resole-type phenolic resins with coal-tar pitch for porous carbons", Journal of Analytical and Applied Pyrolysis, 2006, vol. 76, pp. 80-87.

*Primary Examiner* — Stuart L Hendrickson
(74) *Attorney, Agent, or Firm* — Cantor Colburn LLP

(57) ABSTRACT

A method for preparing a porous carbon material by using coal tar generated in a coke oven gas (COG) process is provided. The method includes: removing quinoline insoluble (QI) by mixing tetrahydrofuran (THF) with coal tar generated in a COG purification process; distilling coal tar by adding a phenolic resin to the QI-removed coal tar, and heating the same at a temperature of 100° C. to 330° C.; carbonizing the distilled coal tar by heating the same at 350° C. to 600° C.; mixing a carbide after the carbonization step and the coal tar, which has been distilled before the carbonization, and grinding/granulating the same; mixing the ground/granulated carbide and the coal tar, which has been distilled before the carbonization, with a pore forming agent, and heat treating the same at 300° C. to 500° C.; and forming pores by making the heat treated carbon material come into contact with water vapor at 700° C. to 1000° C.

7 Claims, No Drawings

METHOD FOR PREPARING POROUS CARBON MATERIAL BY USING COAL TAR GENERATED IN COG PROCESS

TECHNICAL FIELD

The present disclosure relates to a method for preparing a porous carbon material using coal tar, a by-product in a steelmaking process, and more particularly, to a method for preparing granular activated carbon using water vapor from a carbon material obtained by purifying/distilling coal tar generated in a COG purification process.

BACKGROUND ART

Coal tar may be recycled as a by-product of steel generated in the COG purification process and may be prepared as a high value-added carbon material. Among the porous carbon materials, activated carbon has been widely used for everyday life and industrial applications due to its unique adsorption properties. However, thereamong, high-performance activated carbon depends entirely on imports.

In the related art, activated carbon was prepared using water vapor/chemicals, or the like, based on a raw material such as coconut shell, wood-based or coal-based, cellulose, and the like. Activated carbon for electrodes was prepared by heating coconut shell, coal-based or the wood-based and the like, as raw materials of activated carbon, in a temperature range of 700° C. to 1000° C. for 5 min. to 15 min. in a hydrogen atmosphere, and then by activation-treating in a temperature range of 700° C. to 800° C. Then, it was impregnated and mixed in a basic solution and then dried using a bio rice straw, a by-product of agriculture, and nitrogen containing water vapor was then injected into a reactor to prepare activated carbon having a specific surface area of 772 $m^2/g$.

A production yield of essential oil by-product generated in a purification process of petroleum is low. In addition, porous carbon materials for energy storage were prepared mainly by using chemicals as the by-product generated in the purification process of petroleum. However, activated carbon for removal of harmful gasses using water vapor was not prepared using coal tar generated in the steel mill COG purification process. This is because it may be very difficult to develop a specific surface area on coal tar-based carbon materials, which increases an adsorption capacity of activated carbon. Accordingly, chemicals, in which it is relatively easy to form pores, were used.

DISCLOSURE

Technical Problem

The present disclosure has been made in order to solve the problems in the prior art described above. An aspect of the present disclosure is to provide a method for preparing activated carbon not only having an excellent adsorption capacity but also having high energy storage efficiency and harmful gas removal efficiency by treating it under special process conditions using coal tar as carbon raw materials.

In addition, the technical problems to be solved by the present invention are not limited to the technical problems mentioned above, and other technical problems which are not mentioned can be clearly understood to those skilled in the art to which the present invention belongs.

Technical Solution

According to an aspect of the present disclosure, a method for preparing a porous carbon material includes steps of: removing quinoline insoluble (QI) by mixing tetrahydrofuran (THF) with coal tar generated in a COG purification process; distilling coal tar by adding a phenolic resin to the QI-removed coal tar, and then heating the same at a temperature of 100° C. to 330° C.; carbonizing the distilled coal tar by heating the same at a temperature of 350° C. to 600° C.; mixing a carbide after the carbonization step and the coal tar, which has been distilled before the carbonization, and then grinding/granulating the same; mixing the ground/granulated carbide and the coal tar, which has been distilled before the carbonization, with a pore forming agent, and then heat treating the same at a temperature of 300° C. to 500° C.; and forming pores by making heat treated carbon material come into contact with water vapor at a temperature of 700° C. to 1000° C.

It is preferable to add the phenolic resin in a range of 1 to 5 wt %.

It is preferable that the carbide and coal tar, which has been distilled before the carbonization step are ground so as to have a particle diameter of 100 μm or less.

It is preferable that a mixing ratio of the carbide, and the coal tar, which has been distilled before the carbonization step and a pore forming agent is 40 to 65 wt % of carbide, 15 to 40 wt % of coal tar, which has been distilled, and 10 to 25% of a pore forming agent.

As the pore forming agent, one of sucrose, maltitol, and sorbitol may be used.

Upon mixing with the pore forming agent, a starch syrup or a starch solution, a binder may be added.

In granulating the carbide, it is preferable to add an aqueous solution in which water, ethanol, acetone, ethylene glycol, or the like, is mixed with the carbide.

It is preferable that the temperature of the water vapor be maintained in a range of 200° C. to 750° C.

Advantageous Effects

According to the present disclosure, granular activated carbon having an excellent electrostatic capacity and a high adsorption ratio against a harmful gas may be prepared by performing distillation, purification, carbonization, and heating with coal tar as a raw material and then performing heat treatment. The porous carbon material thus prepared is mainly used for removing VOCs and for storing energy of supercapacitors.

The present disclosure shows a technology for preparing high-value-added activated carbon by utilizing a coal tar raw material produced in a domestic steel mill, which can lower external dependency on the carbon material, and can create a high-added value with a high raw material utility value.

BEST MODE FOR INVENTION

Hereinafter, the present disclosure will be described in detail.

The present disclosure provides a method for preparing granular activated carbon using coal tar as a raw material generated in a steel mill COG purification process. The activated carbon prepared according to the present disclosure may be utilized for an electrode material of a supercapacitor, and for removing sulfur and volatile organic compounds.

According to the present disclosure, a method for preparing activated carbon includes steps of: removing quinoline insoluble (QI) by mixing tetrahydrofuran (THF) with coal tar generated in a COG purification process; distilling coal tar by adding a phenolic resin to the QI-removed coal tar, and then heating the same at a temperature of 100° C. to 330° C.; carbonizing the distilled coal tar by heating the same at 350° C. to 600° C.; mixing a carbide after the carbonization step and the coal tar, which has been distilled before the carbonization, and then grinding/granulating the same; mixing the ground/granulated carbide and the coal tar, which has been distilled before the carbonization, with a pore forming agent, and then heat treating the same at 300° C. to 500° C.; and forming pores by making the heat treated carbon material come into contact with water vapor at 700° C. to 1000° C.

First, quiinoline insoluble (QI) is removed by mixing tetrahydrofuran (THF) in coal tar generated in the coke oven gas (COG) purification process.

It is preferable that the coal tar used as a starting material in the present disclosure, is a by-product generated in the COG purification process in a steelmaking process.

In order to remove QI from the coal tar as above, tetrahydrofuran (THF) as a solvent is mixed with coal tar for 5 minutes to 30 minutes, and then filtrated and separated. QI acts an impurity in preparing needle or isotropic cokes, and impregnated pitches, which deteriorates quality. Thus, the QI may be removed to improve the quality of coal tar. By adding THF, coal tar may be purified and distillation characteristics may be realized.

Next, in the present disclosure, a phenolic resin is added to the QI-removed coal tar and then coal tar is distilled by heating it at 100° C. to 330° C. That is, after the phenolic resin is added to the coal tar, the coal tar distillation is performed at 100° C. to 330° C. As the distillation temperature of the coal tar is higher, a material having a higher softening point is prepared.

In this case, in the present disclosure, it is preferable to add the phenolic resin in a range of 1 to 5 wt %.

The distilled coal tar is carbonized by heating to 350° C. to 600° C. That is, purified coal tar is carbonized in a nitrogen inert atmosphere at a temperature in a range of 350° C. to 600° C.

In this case, the carbonization temperature is performed at 350° C. to 600° C., and it is preferable to be performed from 30 minutes to 1 hour. If the carbonization temperature is less than 350° C., it may be in a difficulty in grinding/granulation due to a large amount of components that are melted and softened when the temperature is applied. If the carbonization temperature exceeds 600° C., a volatile content thereof decreases and it is difficult to form a specific surface area.

Next, in the present disclosure, the carbide after the carbonization step is mixed with the coal tar, which has been distilled before the carbonization, and the mixture is ground/granulated. That is, the carbide and the distilled coal tar are mixed at a certain ratio and then ground. Ground particles are ground to a size of 100 um or less, and a grinding method is not particularly limited.

Then, the ground carbide is granular granulated, and a particle size of the carbide should be 10 um or less, and the grinding may be performed using a jet mill.

In addition, an aqueous solution such as water, ethanol, acetone, ethylene glycol, or the like, as an additive for making granules, is mixed. Preferably, it is mixed in a ratio of 10 to 40%. It is preferable that the shape is a spherical shape, a cylindrical shape, and a pellet shape.

Thereafter, the ground/granulated carbide and the distilled coal tar before the carbonization are mixed with a pore forming agent and then heat treated at 300° C. to 500° C.

That is, the carbide is granulated and mixed with the pore forming agent. In this case, it is preferable that a mixing ratio of the carbide, the distilled coal tar, and the pore forming agent is 40 to 65% of carbide, 15 to 40% of distilled coal tar, and 10 to 25% of a pore forming agent. When carbides and coal tar are have the respective carbides/coal tar/pore forming agents excessively added thereto, formation of pores is difficult and thus formation of a specific surface area is difficult, and when a large amount of pore forming agents are added, the carbonization yield may be greatly decreased and strength may also be lowered.

In the present disclosure, a hydrophilic material should be used as the pore forming agent to form pores coming into contact with water vapor, and preferably, one of sucrose, maltitol, and sorbitol may be used.

In this case, in the present disclosure, a starch syrup or a starch solution may be mixed with a binder.

Next, in the present disclosure, the mixed carbon material is sintered at 300° C. to 500° C. in an oxidation atmosphere. If a sintering temperature is less than 300° C., oxidation stability may not be achieved and softened and then discarded, and if a sintering temperature exceeds 500° C., a volatile content of the mixed carbon material may decrease, which may make it difficult to form a specific surface area. A sintering time may have in a range of 30 minutes to 7 hours.

In addition, an aqueous solution such as water, ethanol, acetone, ethylene glycol, or the like, is mixed as an additive for making granules. Preferably, it is mixed in a ratio of 10 to 40%. It is preferable that the shape is a spherical shape, a cylindrical shape, or a pellet shape.

Finally, in the present disclosure, the heat-treated carbon material comes into contact with water vapor at 700° C. to 1000° C. to form pores.

That is, water vapor is injected into the heat-treated material at 700° C. to 1000° C. If the temperature is less than 700° C., water vapor and the heat-treated sample may not be oxidized and may be eroded, so that forming pores may be difficult, and if the temperature exceeds 1000° C., the formed pores may be merged or aggregated with each other and a pore structure may be destroyed to fail to forma sufficient specific surface area. A reaction time is preferably 3 to 7 hours.

MODE FOR INVENTION

Hereinafter, the present disclosure will be described in detail with reference to the embodiments.

Embodiment

Three types of porous carbon were prepared through the following processes using coal tar generated in a COG purification process of a steelmill.

Coal tar was mixed with 10% of THF for 30 minutes to remove QI, and the THF was separately filtered. Thereafter, 5% of phenolic resin was added to the QI-removed coal tar and then the temperature was increased from room temperature to 330° C. stepwise and distilled for 2 hours.

The purified coal tar was carbonized in a nitrogen inert atmosphere in a temperature range of 450° C.

The distilled coal tar and the carbide obtained by carbonization were ground to a size of 100 um or less using a JET mill.

Thereafter, the carbides were granulated at three ratios as shown in the following Table 1.

TABLE 1

| Coal No. | Coal tar carbide | Coal tar distillate | Pore forming agent | Binder (starch syrup) | Mixture | Specific surface area (m²/g) |
|---|---|---|---|---|---|---|
| 1 | 40 to 70% | 17 to 30% | Surcose: 10 to 30% | 15 to 45% | Ethanol/Water | 954 to 1200 |
| 2 | 50 to 75% | 20 to 40% | Maltitol: 10~30% | 15 to 45% | Acetone/water | 567 to 750 |
| 3 | 60 to 80% | 10 to 30% | Solbitol: 10~35% | 15 to 45% | Ethylene glycol/water | 645 to 750 |

Then, the three kinds of carbon materials were heat-treated at 350° C. for 6 hours in an oxidation atmosphere. Then, the heat-treated material was activated at 900° C. for 5 hours using water vapor, and the specific surface areas were measured, and the results thereof and shown in the Table 1. As shown in Table 1, it can be seen that the porous carbon material may be effectively prepared using coal tar, a by-product generated in the COG process of the steel mill, when the preparation method of the present disclosure is used.

While example embodiments have been shown and described above, it will be apparent to those skilled in the art that modifications and variations could be made without departing from the scope of the present inventive concept as defined by the appended claims.

The invention claimed is:

1. A method for preparing a porous carbon material comprising steps of:
   removing quinoline insoluble (QI) by mixing tetrahydrofuran (THF) with coal tar;
   distilling coal tar by adding a phenolic resin to the QI-removed coal tar, and then heating the same at a temperature of 100° C. to 330° C.;
   carbonizing the distilled coal tar by heating the same at a temperature of 350° C. to 600° C.;
   mixing a carbonized carbon after the carbonization step and the distilled coal tar, and then grinding/granulating the same;
   mixing the ground/granulated carbonized carbon and the distilled coal tar, with a pore forming agent, and then heat treating the same at a temperature of 300° C. to 500° C.; and
   forming pores by making the heat treated carbon material come into contact with water vapor at a temperature of 700° C. to 1000° C.

2. The method for preparing the porous carbon material of claim 1, wherein the phenolic resin is added in a range of 1 to 5 wt %.

3. The method for preparing the porous carbon material of claim 1, wherein the carbonized carbon and the distilled coal tar before the carbonization are ground to have a particle diameter of 100 μm or less.

4. The method for preparing the porous carbon material of claim 1, wherein a mixing ratio of the carbonized carbon, the distilled coal tar before the carbonization, and the pore forming agent is 40 to 65 wt % of carbide carbonized carbon, 15 to 40 wt % of distilled coal tar, and 10 to 25 wt % of a pore forming agent.

5. The method for preparing the porous carbon material of claim 1, wherein one of sucrose, maltitol, and sorbitol is used as the pore forming agent.

6. The method for preparing the porous carbon material of claim 1, wherein a starch syrup or a starch solution, a binder is added when the carbonized carbon, the distilled coal tar before the carbonization, and the pore forming agent are mixed.

7. The method for preparing the porous carbon material of claim 1, wherein the temperature of the water vapor is maintained in a temperature range of 200° C. to 750° C.

* * * * *